(12) United States Patent
Strandborg et al.

(10) Patent No.: US 11,947,736 B1
(45) Date of Patent: Apr. 2, 2024

(54) UTILISING FOCUSSING OF LIGHT SOURCES IN IMAGE FOR CONTROLLER TRACKING

(71) Applicant: Varjo Technologies Oy, Helsinki (FI)

(72) Inventors: Mikko Strandborg, Hangonkylä (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 18/085,619

(22) Filed: Dec. 21, 2022

(51) Int. Cl.
  *G06F 3/03* (2006.01)
  *G06F 3/038* (2013.01)
  *G06T 7/62* (2017.01)
  *G06T 7/73* (2017.01)

(52) U.S. Cl.
  CPC ............ *G06F 3/0308* (2013.01); *G06F 3/038* (2013.01); *G06T 7/62* (2017.01); *G06T 7/73* (2017.01)

(58) Field of Classification Search
  CPC ......... G06F 3/0308; G06F 3/038; G06T 7/62; G06T 7/73
  See application file for complete search history.

(56) References Cited

U.S. PATENT DOCUMENTS

| | | | | |
|---|---|---|---|---|
| 10,146,335 | B2 * | 12/2018 | Balan | H04N 13/344 |
| 10,705,606 | B1 * | 7/2020 | Colonnese | G06T 7/20 |
| 2004/0076335 | A1 * | 4/2004 | Kim | G06T 7/62 |
| | | | | 382/257 |
| 2005/0174470 | A1 * | 8/2005 | Yamasaki | H04N 23/635 |
| | | | | 348/E5.025 |
| 2005/0264679 | A1 * | 12/2005 | Sasaki | H04N 23/675 |
| | | | | 348/E5.045 |
| 2009/0110235 | A1 * | 4/2009 | Marti | G06F 3/04842 |
| | | | | 382/103 |
| 2015/0168727 | A1 * | 6/2015 | Qaddoura | G06F 3/005 |
| | | | | 345/156 |
| 2016/0260251 | A1 * | 9/2016 | Stafford | G02B 27/0179 |
| 2016/0350975 | A1 * | 12/2016 | Nakagawa | G06T 7/337 |
| 2018/0176483 | A1 * | 6/2018 | Knorr | H04N 5/2723 |
| 2018/0311571 | A1 * | 11/2018 | Huang | G06F 3/012 |
| 2018/0329517 | A1 * | 11/2018 | Steedly | G01D 5/26 |
| 2018/0330521 | A1 * | 11/2018 | Samples | G06T 7/80 |
| 2019/0146598 | A1 * | 5/2019 | Peri | G06F 3/012 |
| | | | | 345/158 |
| 2019/0262697 | A1 * | 8/2019 | Kim | A63F 13/42 |
| 2019/0356848 | A1 * | 11/2019 | Rydberg | G06F 3/011 |
| 2020/0333878 | A1 * | 10/2020 | Steedly | A63F 13/42 |
| 2023/0106457 | A1 * | 4/2023 | Jo | G02B 27/0172 |
| | | | | 345/156 |

\* cited by examiner

*Primary Examiner* — Ariel A Balaoing
(74) *Attorney, Agent, or Firm* — Ziegler IP Law Group

(57) ABSTRACT

A controller-tracking system includes: camera(s) arranged on head-mounted display (HMD); one or more light sources arranged on controller(s) to be tracked, and controller(s) being associated with the HMD. The light sources provide light having wavelength(s). The processor(s) are configured to receive image(s) representing controller(s); identify image segment(s) in image(s) that represents light source(s); determine level of focussing of light source(s) in image(s), based on characteristics associated with pixels of image segment(s); determine distance between camera(s) and light source(s), based on level of focussing, intrinsic parameters of camera(s), and reference focussing distance corresponding to wavelength of light provided by light source(s); and determine pose of controller(s) in global coordinate space of real-world environment, using distance between camera(s) and light source(s).

28 Claims, 4 Drawing Sheets

UTILISING FOCUSSING OF LIGHT SOURCES IN IMAGE FOR CONTROLLER TRACKING

TECHNICAL FIELD

The present disclosure relates to controller-tracking systems. The present disclosure also relates to methods for controller-tracking.

BACKGROUND

In recent times, immersive extended-reality (XR) technologies such as virtual-reality (VR), augmented-reality (AR), mixed-reality (MR) are being employed in various fields such as entertainment, real estate, training, medical imaging operations, simulators, navigation, and the like. Such immersive XR technologies create immersive XR environments for presentation to a user of an XR device (such as an XR headset, a pair of XR glasses, or similar). Generally, users interact with the XR environments by way of specialized interaction controllers such as joysticks, remote controllers, computer mice, simulated reality consoles, and the like.

Some of existing interaction controllers comprise a plurality of light-emitting elements (for example, such as light-emitting diodes (LEDs)) or other light sources that are arranged on an interaction controller in a way that the interaction controller is visible to the XR device of the user from all angles and orientations. The illumination of such light-emitting elements enables the tracking of the interaction controller by using cameras arranged on the XR device. However, such a manner of tracking the interaction controller is inefficient, and is limited to considerably shorter controller-tracking range. Thus, when the interaction controller is considerably far from the XR device, tracking of the interaction controller is error-prone and unreliable. Moreover, some existing solutions for tracking the interaction controller are limited to tracking only a single interaction controller at a time. Thus, when the user uses multiple interaction controllers simultaneously, tracking the multiple interaction controllers at a time becomes quite complicated and difficult.

Therefore, in light of the foregoing discussion, there exists a need to overcome the aforementioned drawbacks associated with existing solutions for tracking the interaction controllers.

SUMMARY

The present disclosure seeks to provide a controller-tracking system. The present disclosure also seeks to provide a method for controller-tracking. An aim of the present disclosure is to provide a solution that overcomes at least partially the problems encountered in prior art.

In a first aspect, an embodiment of the present disclosure provides a controller-tracking system comprising:
at least one camera arranged on a portion of a head-mounted display (HMD) that faces a real-world environment in which the HMD is in use; one or more light sources arranged on at least one controller that is to be tracked, the at least one controller being associated with the HMD, wherein the one or more light sources, in operation, provide light having at least one wavelength that is detectable by the at least one camera; and
at least one processor configured to:
receive at least one image captured by the at least one camera, the at least one image representing the at least one controller from a perspective of the at least one camera;
identify at least one image segment in the at least one image that represents at least one light source of the at least one controller;
determine a level of focussing of the at least one light source in the at least one image, based on characteristics associated with pixels of the at least one image segment;
determine a distance between the at least one camera and the at least one light source, based on the level of focussing of the at least one light source in the at least one image, intrinsic parameters of the at least one camera, and a reference focussing distance corresponding to a wavelength of light provided by the at least one light source; and
determine a pose of the at least one controller in a global coordinate space of the real-world environment, using the distance between the at least one camera and the at least one light source.

In a second aspect, an embodiment of the present disclosure provides a method for controller-tracking, the method comprising:
receiving at least one image captured by at least one camera, the at least one image representing at least one controller from a perspective of the at least one camera, the at least one camera being arranged on a portion of a head-mounted display (HMD) that faces a real-world environment in which the HMD is in use, and wherein one or more light sources are arranged on the at least one controller that is to be tracked, the at least one controller being associated with the HMD, and wherein the one or more light sources, in operation, provide light having at least one wavelength that is detectable by the at least one camera;
identifying at least one image segment in the at least one image that represents at least one light source of the at least one controller;
determining a level of focussing of the at least one light source in the at least one image, based on characteristics associated with pixels of the at least one image segment;
determining a distance between the at least one camera and the at least one light source, based on the level of focussing of the at least one light source in the at least one image, intrinsic parameters of the at least one camera, and a reference focussing distance corresponding to a wavelength of light provided by the at least one light source; and
determining a pose of the at least one controller in a global coordinate space of the real-world environment, using the distance between the at least one camera and the at least one light source.

Embodiments of the present disclosure substantially eliminate or at least partially address the aforementioned problems in the prior art, and enable simple, reliable, and accurate tracking of one or more controllers by way of utilising focussing of light sources in images, in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
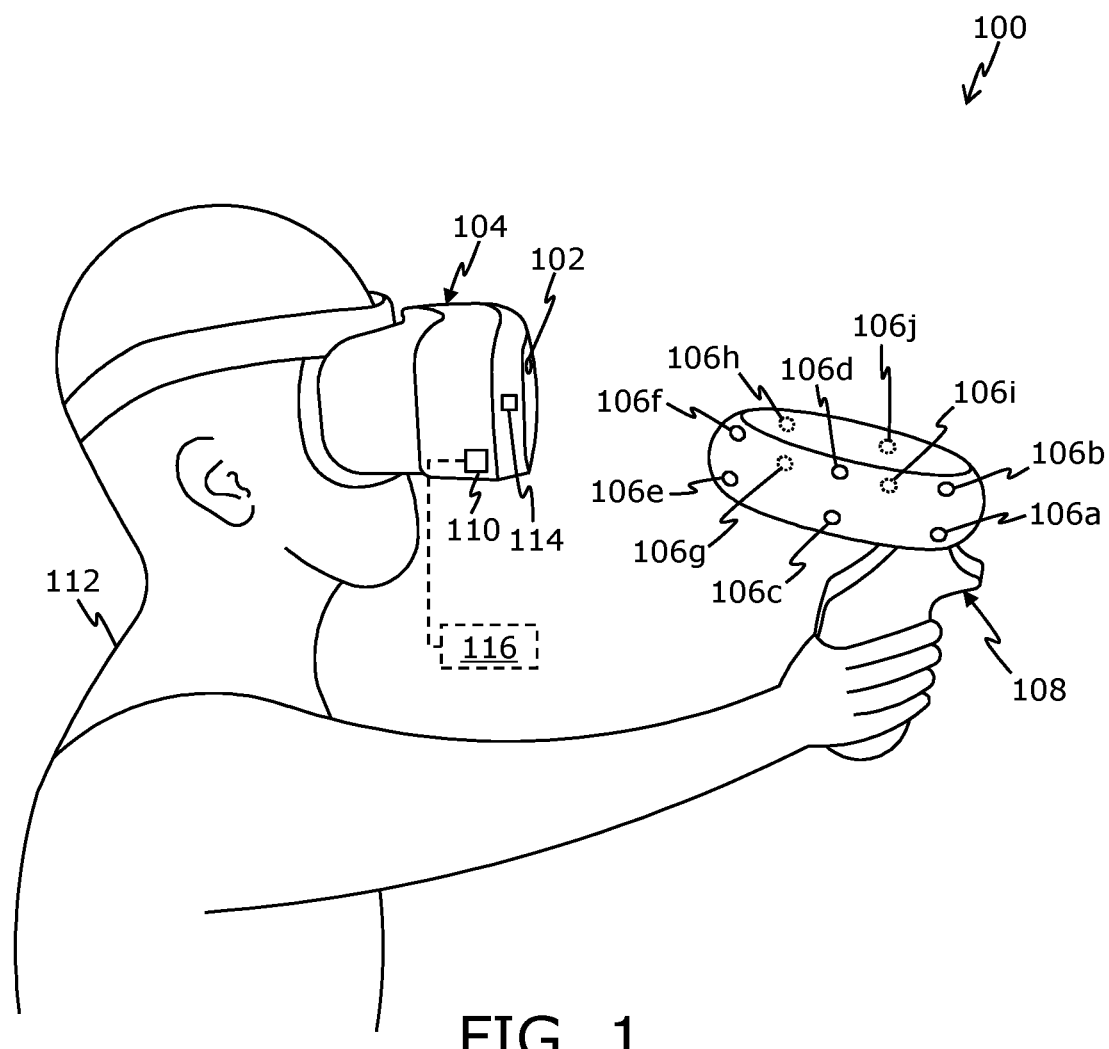
FIG. 1 is a schematic illustration of an exemplary environment in which a controller-tracking system is in use, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a controller-tracking system comprising:
  at least one camera arranged on a portion of a head-mounted display (HMD) that faces a real-world environment in which the HMD is in use; one or more light sources arranged on at least one controller that is to be tracked, the at least one controller being associated with the HMD, wherein the one or more light sources, in operation, provide light having at least one wavelength that is detectable by the at least one camera; and
  at least one processor configured to:
    receive at least one image captured by the at least one camera, the at least one image representing the at least one controller from a perspective of the at least one camera;
    identify at least one image segment in the at least one image that represents at least one light source of the at least one controller;
    determine a level of focussing of the at least one light source in the at least one image, based on characteristics associated with pixels of the at least one image segment;
    determine a distance between the at least one camera and the at least one light source, based on the level of focussing of the at least one light source in the at least one image, intrinsic parameters of the at least one camera, and a reference focussing distance corresponding to a wavelength of light provided by the at least one light source; and
    determine a pose of the at least one controller in a global coordinate space of the real-world environment, using the distance between the at least one camera and the at least one light source.

In a second aspect, an embodiment of the present disclosure provides a method for controller-tracking, the method comprising:
  receiving at least one image captured by at least one camera, the at least one image representing at least one controller from a perspective of the at least one camera, the at least one camera being arranged on a portion of a head-mounted display (HMD) that faces a real-world environment in which the HMD is in use, and wherein one or more light sources are arranged on the at least one controller that is to be tracked, the at least one controller being associated with the HMD, and wherein the one or more light sources, in operation, provide light having at least one wavelength that is detectable by the at least one camera;
  identifying at least one image segment in the at least one image that represents at least one light source of the at least one controller;
  determining a level of focussing of the at least one light source in the at least one image, based on characteristics associated with pixels of the at least one image segment;
  determining a distance between the at least one camera and the at least one light source, based on the level of focussing of the at least one light source in the at least one image, intrinsic parameters of the at least one camera, and a reference focussing distance corresponding to a wavelength of light provided by the at least one light source; and
  determining a pose of the at least one controller in a global coordinate space of the real-world environment, using the distance between the at least one camera and the at least one light source.

The present disclosure provides the aforementioned controller-tracking system and the aforementioned method for controller-tracking facilities in simple, reliable, and accurate tracking of the at least one controller, in real time or near-real time. Herein, the level of focussing of the at least one light source in the at least one image, the intrinsic parameters, and the reference focussing distance enable in determining the distance between the at least one camera and the at least one light source for estimating the pose of the at least one controller. Advantageously, such a manner of tracking the at least one controller is reliable, and is suitable for a wide controller-tracking range, for example, from 20 centimeters to 1.5 meters. Moreover, the system and the method are susceptible for tracking even more than one controller at a time when the user uses multiple interaction controllers simultaneously. The system is simple, userfriendly, and robust. The method is fast, effective, reliable and can be implemented with ease.

Throughout the present disclosure, the term "controller-tracking" refers to detecting and/or following the at least one controller in the real-world environment. The term "controller" refers to a specialized equipment that is used by a user to interact with a simulated environment, for example, such as an extended-reality (XR) environment. The term "extended-reality" encompasses virtual reality (VR), augmented reality (AR), mixed reality (MR), and the like.

It will be appreciated that the user interacts with the simulated environment by at least one of: moving the at least one controller within the real-world environment, providing an input via the at least one controller. Optionally, the at least one controller is handheld by the user. Optionally, the user provides the input using at least one of: a button, a touch-sensitive display, a microphone, of the at least one controller. Optionally, the at least one controller is implemented as at least one of: a keyboard, a mouse, a touchpad, a push button controller, a joystick, a gamepad, an interactive board, a tablet computer, a laptop computer, a trackball. Optionally, the at least one controller has a curved loop portion and a stick portion coupled to the curved loop portion.

The term "head-mounted display" device refers to a specialized equipment that is configured to present the XR environment to a user when said HMD device, in operation, is worn by the user on his/her head. The HMD device is implemented, for example, as an XR headset, a pair of XR glasses, and the like, that is operable to display a scene of the XR environment to the user.

Throughout the present disclosure, the term "camera" refers to an equipment that is operable to detect and process light signals received from the real-world environment, so as to capture images of the real-world environment. It will be appreciated that the at least one camera may comprise a first camera and a second camera for capturing said images from a perspective of a left eye and a right eye of a user, respectively. Optionally, in this regard, the first camera and the second camera are arranged to face said real-world environment in a manner that a distance between them is equal to an interpupillary distance (IPD) between the left eye and the right eye. In an example, the distance between the first camera and the second camera may be equal to an average IPD.

Optionally, the at least one camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the at least one camera is implemented as a depth camera. Examples of the depth camera include, but are limited to, a Time-of-Flight (ToF) camera, a light detection and ranging (LiDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. The at least one camera is optionally implemented as a combination of the visible-light camera and the depth camera. Optionally, the at least one camera is communicably coupled to the at least one processor, wirelessly and/or in a wired manner.

Throughout the present disclosure, the term "processor" refers to hardware, software, firmware or a combination of these, suitable for controlling the operation of the controller-tracking system. Optionally, the at least one processor is communicably coupled with the HMD and the at least one controller, wirelessly and/or in a wired manner. It will be appreciated that the term "at least one processor" refers to "one processor" in some implementations, and "a plurality of processors" in other implementations. In some implementations, the at least one processor is implemented as a processor of the HMD. In other implementations, the at least one processor is implemented as the processor of the HMD and a processor of an external computing device, wherein the external computing device is communicably coupled with the HMD wirelessly or in a wired manner. In such a case, at least a part of all the aforementioned processing tasks of the at least one processor is performed at the processor of the external computing device. This considerably reduces processing burden on the processor of the HMD.

Throughout the present disclosure, the term "light source" refers to an element from which light emanates. Optionally, the one or more light sources is arranged spatially around the at least one controller, on the curved loop portion of the at least one controller. Optionally, the one or more light sources comprises at least two of: an IR light-emitting diode, a visible-light emitting diode. Optionally, a given light source is an active light source. This means the given light source provides the light by emitting the light itself. Alternatively, optionally the given light source is a passive light source. This means that the given light source provides the light by reflecting the light incident thereupon. Examples of the one or more light source include, but are not limited to, a light-emitting diode (LED), a laser. The laser may be a vertical-cavity surface-emitting laser (VCSEL), an edge-emitting laser (EEL), and the like.

It will be appreciated that the one or more light sources are arranged on the at least one controller in a manner that a total number of the one or more light sources sufficiently provides a complete cover of the at least one controller from different viewing directions, and thus facilitates in a stable and an accurate controller-tracking. Optionally, a number of the one or more light sources lies in a range of 5 to 40. Moreover, the total number of the one or more light sources to be arranged on the at least one controller may depend on a shape of the curved loop portion of the at least one controller. A given light source could also be a structured light source having a particular shape. In such a case, a representation of said shape in the at least one image could be an indicative of an orientation of the at least one controller.

It is to be understood that when the at least one camera faces the real-world environment, a whole surface area of the at least one controller that has the one or more light sources arranged thereon is not completely visible from the perspective of the at least one camera at any given time instant. Therefore, the at least one image only represents a part of the at least one controller that is visible from the perspective of the at least one camera. As the user interacts within the XR environment using the at least one controller, a position and an orientation of the at least one controller may continuously change. Thus, a sequence of images is received by the at least one camera upon capturing said sequence by the at least one camera, as the user uses the at least one controller during a given XR session. Such a sequence of images may represent the at least one controller at different time instants from different viewing positions and different viewing angles of the at least one camera. The at least one image could be an RGB image, RGB-D image, and the like.

Optionally, the one or more light sources provide light by at least one of: light emitter, light reflector, light transmitter, light transflector. The light emitter provides the light by emitting the light itself. The light emitter may, for example, be a light-emitting diode. The light reflector provides the light by reflecting the light incident thereupon. The light transmitter provides the light by absorbing the light incident thereupon, and then reflecting the (absorbed) light. The light transflector provides the light by reflecting and transmitting the light thereupon. The light transflector may, for example, be a transflective liquid-crystal display. The light emitter, the light reflector, the light transmitter, and the light transflector are well-known in the art.

Optionally, the one or more light sources comprise an array of light sources that are arranged in proximity to each other, wherein different light sources amongst the array, in operation, provide light having different wavelengths, and wherein each light source of the array is individually controllable to be switched on and switched off according to a pattern. In this regard, each light source of the array is an active light source that provides the light by emission, the light having a particular wavelength. Optionally, the at least one processor of the controller-tracking system or at least one other processor is configured to control each light source of the array, the at least one processor or at least one other processor being communicably coupled to the one or more light sources. It will be appreciated that since the pattern in which each light source of the array is to be switched on and switched off is already and accurately known to the at least one processor (or the at least one other processor), it would be easy to identify that at a given time instant, which light sources are represented in the at least one image in switched-on state or switched-off state. Moreover, since the one or more light sources are to be switched on and switched off according to the pattern, all light sources need not be unnecessarily switched at all time instants, thus power resources of the controller-tracking system are saved. The pattern could be either system defined or user defined. In an example, an array of five LEDs A1, A2, A3, A4, and A5 may provide the light having different wavelengths W1, W2, W3, W4, and W5, respectively. The five LEDs in the array are switched on and switched off in a cyclic sequence: A1, A2, A3, A4, A5, A1, A2, and so on. It will be appreciated that using the different wavelengths facilitates in improving accuracy of controller-tracking as different wavelengths would correspond to different focus distances.

Optionally, the one or more light sources, in operation, provide light having different wavelengths at different times, and the at least one image comprises a plurality of images that are captured at the different times. In this regard, a same light source from amongst the one or more light sources can be used for providing the light having the different wavelengths at the different times. This potentially reduces an overall number of light sources required for providing the light having the different wavelengths at the different times. It will be appreciated that capturing the plurality of images at the different times (when the light sources are providing the light at the different wavelengths) subsequently facilitates in accurately identifying the at least one image segment in the at least one image, the at least one image segment representing the at least one light source of the at least one controller at a given time instant. This is because the at least one light source may appear to be well-focussed in the at least one image, when the at least one light source provides the light having a particular wavelength. Otherwise, the at least one light source may appear to be blurred in the at least one image, when the at least one light source provides the light having some other wavelength(s). In an example, the at least one light source may provide the light having a wavelength of 5000 nanometres that is detectable by the at least one camera. In such a case, light sources providing light having wavelengths equal or nearly equal to 5000 nanometres are in-focus in the at least one image captured by the at least one camera, while other light sources are represented in varying levels of defocus in the at least one image.

Optionally, the at least one camera comprises a plurality of autofocus cameras and the at least one controller comprises a plurality of controllers, and wherein the at least one processor is further configured to:

receive, from an external tracking means, estimated distances of a plurality of light sources of the plurality of controllers from the plurality of autofocus cameras; and control the plurality of autofocus cameras for capturing images representing one or more controllers amongst the plurality of controllers from perspectives of the plurality of autofocus cameras, by one of:

selecting a common focus to be employed for focussing the plurality of autofocus cameras, based on the estimated distances; or adjusting focuses of the plurality of autofocus cameras according to the estimated distances, in a multiplexed manner.

In this regard, a given autofocus camera has an adjustable optical focus. This means that the given autofocus camera is focusable i.e., a focal plane of at least one optical element (for example, a camera lens) of the given autofocus camera is adjustable. Such an adjustment facilitates in capturing sharp images of objects (for example, such as the at least one controller) present in the real-world environment. In an example, the plurality of controllers may comprise two controllers, each controller being handheld in each hand of the user. In other words, one controller may be handheld by the user in his/her left hand, while another controller may be handheld by the user in his/her right hand.

Throughout the present disclosure, the term "external tracking means" refers to specialized equipment that is employed to track a pose of a given controller (particularly, light source(s) arranged on the given controller) and a given camera within the real-world environment, so as to estimate distances of the light source(s) of the given controller from the given camera. Optionally, a processor of the external tracking means is configured to estimate the distances of the light source(s) of the given controller from the given camera during the aforesaid tracking. Such an estimation may, for example, be performed using at least one mathematical technique. The at least mathematical technique could, for example, be based on trigonometry, coordinate geometry, or similar. Hereinabove, the term "given camera" encompasses the given autofocus camera.

It will be appreciated that the external tracking means is to be understood to be implemented as an outside-in tracking means. The external tracking means could be implemented as at least one detector that is employed to detect at least one detectable object. The at least one detectable object is implemented as at least one marker (for example, such as an active infra-red (IR) LED, a visible LED, a laser illuminator, and the like), whereas the at least one detector is implemented as at least one of: an IR camera, an IR transceiver, a visible light camera, an RFID reader. The external tracking means could also be implemented as at least one processor that is configured to determine the aforesaid poses using a Simultaneous Localization and Mapping (SLAM) technique.

It will also be appreciated that a given image captured by a given autofocus camera (from amongst the plurality of autofocus cameras) would represent one or more controllers which visible from a perspective of the given autofocus camera. Optionally, the common focus to be employed for focussing the plurality of autofocus cameras lies at a distance equal to an average of the estimated distances. The technical benefit of employing such a common focus is that it is relatively simple, fast, and easy to implement. Moreover, this facilitates the given autofocus camera to capture acceptably well-focussed controllers (particularly, light source(s) arranged on the controllers) in the images. This subsequently helps in accurately identifying the at least one image segment representing the at least one light source.

Alternatively, optionally, the plurality of autofocus cameras are controlled to operate by employing multiplexing. Such a multiplexing is performed in a manner that the plurality of autofocus cameras do not interfere with each other, are well-synchronized with each other for capturing the images. The technical benefit of employing the multiplexing is that each controller (and thus, light source(s) arranged on that controller) is highly well-focussed in at least one image from amongst the images. In an example, the aforesaid multiplexing may be time-division multiplexing, wherein a given autofocus camera is employed for capturing the images in a given time period. For example, at a time instant T1, focuses of the plurality of autofocus cameras may be adjusted to capture the images representing one controller from amongst the plurality of controllers. At a time instant T2, focuses of the plurality of autofocus cameras may be adjusted to capture the images representing another controller from amongst the plurality of controllers, and so on. It will be appreciated that a type of multiplexing to be employed is selected by the at least one processor. The at least one processor may also employ wavelength-division multiplexing or space-division multiplexing. Furthermore, instead of employing the plurality of autofocus cameras, a plurality of cameras having adjustable apertures could also be employed.

Throughout the present disclosure, the term "image segment" of a given image refers to a portion of the given image representing the at least one controller. It is to be understood that when the at least one controller has multiple light sources arranged thereon, at a given time instant, the at least one light source from amongst the multiple light sources would be visible in the at least one image. The at least one image segment may represent an entirety or a part of the at least one light source. Optionally, the at least one image segment comprises a set of pixels. Optionally, in this regard, the set of pixels comprises at least one pixel.

Optionally, when identifying the at least one image segment of the at least one image, the at least one processor is configured to extract features from the at least one image. Examples of the features include, but are not limited to, edges, corners, blobs, ridges, high-frequency features (such as high frequency colour changes). Optionally, the at least one processor is configured to employ at least one data processing algorithm for extracting the features from the at least one image. Examples of the at least one data processing algorithm include, but are not limited to, an edge-detection algorithm (for example, such as Canny edge detector, Deriche edge detector and the like), a corner-detection algorithm (for example, such as Harris & Stephens corner detector, Shi-Tomasi corner detector, Features from Accelerated Segment Test (FAST) corner detector and the like), a blob-detection algorithm (for example, such as Laplacian of Gaussian (LoG)-based blob detector, Difference of Gaussians (DoG)-based blob detector, Maximally Stable Extremal Regions (MSER) blob detector, and the like), a feature descriptor algorithm (for example, such as Binary Robust Independent Elementary Features (BRIEF), Gradient Location and Orientation Histogram (GLOH), Histogram of Oriented Gradients (HOG), and the like), a feature detector algorithm (for example, such as the SIFT, the SURF, Oriented FAST and rotated BRIEF (ORB), and the like). Such data processing algorithms are well-known in the art.

It will be appreciated that the at least one processor need not identify objects or their parts in the at least one image, but only need to identify the at least one image segment of the at least one image that represents the at least one light source. It will also be appreciated that the at least one image segment of the at least one image can also be identified, for example, by using contrast analysis, edge detection, Fourier analysis, or similar.

Optionally, the at least one camera has an apodized aperture, and wherein a transmission curve associated with the apodized aperture affects a shape of the at least one image segment in the at least one image. Herein, the term "apodised aperture" refers to an aperture which has a gradual transition of light transmission along a radius of said aperture in a manner that the light transmission at a centre of said aperture is maximum and the light transmission at an edge of said aperture is zero. Such a gradual transition of the light transmission follows, for example, such as a Gaussian distribution curve. The technical benefit of having the apodized aperture (i.e., a semi-transparent aperture) facilitates in accurately and easily identifying the at least one image segment in the at least one image, thereby determining the level of focussing of the at least one light source more conveniently. Using the apodized aperture may also facilitates in having considerably lesser diffraction-induced resolution loss in the at least one image. The apodized aperture is well-known in the art.

Throughout the present disclosure, the term "level of focussing" refers to an extent of focussing of a given light source in a given image. In other words, the level of focussing indicates how well the given light source is focussed and captured in the given image. Greater the level of focussing of the given light source in the given image, greater is the sharpness of the given light source in the image, and vice versa. Thus, when the level of focussing is high, it indicates that the given light source is captured sharply (namely, acceptably well-focussed) in the given image. When the level of focussing is low, it indicates that the given light source is captured blurred (namely, not acceptably focussed) in the given image. The level of focussing could also be intermediate i.e., when the level of focussing is neither too high nor too low.

In an example, the characteristics associated with the pixels could be at least brightness information of the pixels. Greater the brightness of a given pixel in the given image, greater is the level of focussing corresponding to the given pixel, and vice versa. This is because a well-focussed pixel in the given image would appear to be brighter than a pixel that is poorly focussed (namely, is blurred) in the given image.

Optionally, when determining the level of focussing of the at least one light source in the at least one image, the at least one processor is configured to:

identify at least one central pixel of the at least one image segment;

measure a brightness of the at least one central pixel;

determine a difference between a pre-known brightness of the at least one light source and the brightness of the at least one central pixel, wherein said difference is indicative of the level of focussing of the at least one light source in the at least one image.

In this regard, since the at least one image segment is identified by the at least one processor, the at least one central pixel can be easily ascertained by the at least one processor. In one case, the at least one central pixel may be a single central pixel that lie in a centre of the at least one image segment. In another case, the at least one central pixel may be a group of several pixels that lie in a central region of the at least one image segment. Thus, in both the aforesaid cases, the at least one central pixel constitutes a centre spot of the at least one image segment, the centre spot being formed by one or more pixels of the at least one image segment. The centre spot could be determined more accurately when said spot has gaussian curve-like shape. A shape of aperture of the at least one camera may have an impact on a shape of blurred spot.

It will be appreciated that information pertaining to the brightness of the at least one central pixel can be easily and accurately known to the at least one processor from the characteristics associated with the pixels of the at least one image segment. When the at least one central pixel is the single central pixel, a brightness of the single central pixel is equal to the brightness of the at least one central pixel. Alternatively, when the at least one central pixel is the group of several pixels, an average brightness of the several pixels of the group are equal to the brightness of the at least one central pixel. Such an average could be a simple average or a weighted average.

Furthermore, lesser the difference between the pre-known brightness of the at least one light source and the aforesaid brightness of the at least one central pixel, greater is the level of focussing of the at least one light source in the at least one image, and vice versa. This is because the aforesaid difference is inversely related to the level of focussing. In other words, when the at least one light source is sharply captured (i.e., well-focussed) in the at least one image, its level of focussing in the at least one image would be high, as the brightness of the at least one central pixel closely conforms to the pre-known brightness, and vice versa.

Alternatively or additionally, optionally, when determining the level of focussing of the at least one light source in the at least one image, the at least one processor is configured to:

determine a diameter of a circle of confusion formed by the at least one image segment; and determine a difference between a pre-known diameter of at least one circle of confusion and the diameter of a circle of confusion, wherein said difference is indicative of the level of focussing of the at least one light source in the at least one image.

The term "circle of confusion" refers to an area in which a point of light appears to grow into a circle in a given image. In general, when the diameter of the circle of confusion is considerably less (i.e., a smaller circle of confusion), it indicates the point of light on an image plane is in-focus, thereby creating a very small pointed-circle in the given image.

When the diameter of the circle of confusion is considerably high (i.e., a larger circle of confusion), it indicates the point of light on the image plane is out-of-focus, thereby creating a large blur spot in the given image. The circle of confusion is well-known in the art.

It will be appreciated that since the at least one image segment is identified by the at least one processor, the diameter of the circle of confusion can be ascertained by the at least one processor. It will also be appreciated that the pre-known diameter of the at least one circle of confusion can be pre-known by the at least one processor, based on a size of the at least one light source and transformations between image coordinates of the at least one image segment and the global coordinate space of the real-world environment.

Furthermore, greater the difference between the pre-known diameter of the at least one circle of confusion and the diameter of the circle of confusion, lesser is the level of focussing of the at least one light source in the at least one image, and vice versa. This is because the aforesaid difference is inversely related to the level of focussing. In other words, when the at least one light source is not well-captured (i.e., blurred) in the at least one image, its level of focussing in the at least one image would be low, as the diameter of the circle of confusion does not closely conform to the pre-known diameter, and vice versa. In one embodiment there are two markers (first marker and a second marker or light sources) which are of same size (diameter D) and at the same distance s. If the markers (or light sources) are of different colours (w1 and w2) we can determine distance as per $$Dm1 = f(s, w1, D)$$

$$Dm2 = f(s, w2, D)$$

wherein Dm1 is measured diameter of the first marker and Dm2 is measured diameter of the second marker since there are two unknowns (s and D) and two equations.

Throughout the present disclosure, the term "intrinsic parameter" of the at least one camera refers to an internal parameter of the at least one camera using which a given image is captured by the at least one camera. The intrinsic parameters of the at least one camera may define how image coordinates of a point in the given image are derived, when a spatial position of a corresponding point in the real-world environment is known with respect to the at least one camera. Examples of the intrinsic parameter of the at least one camera include, but are not limited to, a focal length, an aperture, an optical centre, an image sensor format, a field of view.

Throughout the present disclosure, the term "reference focussing distance" refers to a distance from which the at least one light source is best captured (namely, most well-focussed) in the at least one image. It will be appreciated that different wavelengths of the light provided by the at least one light source correspond to different reference focussing distances. For example, a reference focussing distance corresponding to a wavelength of 5000 nanometres would be different (i.e., greater or smaller) as compared to a reference focussing distance corresponding to a wavelength of 1500 nanometres.

Greater the level of focussing of the at least one light source in the at least one image, lesser is a difference between the aforesaid distance and the reference focussing distance, and vice versa. This means when the level of focussing is high (i.e., when the at least one light source appears to be sharp and well-focussed in the at least one image), said distance is equal or nearly equal to the reference focussing distance. Similarly, when the level of focussing is low (i.e., when the at least one light source does not appear to be well-focussed in the at least one image), said distance is greater or lesser than the reference focussing distance. Since the level of focussing is determined by the at least one processor itself, and the intrinsic parameters and the reference focussing distance are already and accurately known to the at least one processor, the at least one processor can easily ascertain how far are the at least one camera and the at least one light source from each other.

Optionally, the at least one processor is further configured to determine the reference focussing distance corresponding to the wavelength of light provided by the at least one light source by one of:

executing a calibration process wherein a user of the at least one controller is instructed to move the at least one controller with respect to the at least one camera until the at least one light source of the at least one controller is in-focus in a calibration image captured during such moving, a distance of the at least one light source from the at least one camera at a time of capturing said calibration image being determined as the reference focussing distance corresponding to the wavelength of light emitted by the at least one light source; or calculating the reference focussing distance corresponding to the wavelength of light emitted by the at least one light source using at least one mathematical formula.

In this regard, in order to be able to determine the distance between the at least one camera and the at least one light source, the reference focussing distance is required to be known beforehand, and thus the aforesaid calibration process is performed. In an example, the calibration is performed prior to using the at least one controller in a given XR session. In another example, the calibration is performed during use of the at least one controller during the given XR session.

When the at least one light source is in-focus in the calibration image, it means that the at least one light source is best captured (i.e., most well-focussed) in said calibration image. Therefore, the distance of the at least one light source from the at least one camera at the time of capturing said calibration image is determined to be the reference focussing distance. Herein, the term "calibration image" refers to an image that is to be used in the calibration process, said image representing the at least one light source of the at least one controller. The technical benefit of determining the reference focussing distance in the aforesaid manner is that the reference focussing distance is determined with high accuracy using the at least one controller (as described in the calibration process above), instead of using pre-known values which may not be precise for the wavelength of light emitted by the at least one light source.

Alternatively, the reference focussing distance is calculated using the at least one mathematical formula. The at least one mathematical formula may be a lens formula (i.e., $1/f=1/u+1/v$, wherein 'f' is a focal length of the at least one camera, 'u' is the distance between the at least one camera and the at least one light source, and 'v' is a distance between an image sensor of the at least one camera and a lens of the at least one camera). The technical benefit of determining the reference focussing distance in the aforesaid manner is that it is relatively easier, simple, fast, and convenient to implement.

Notably, upon determining the distance between the at least one camera and the at least one light source, the pose of the at least one controller is determined. The term "pose" encompasses both a position and an orientation. It will be appreciated that determining the pose of the at least one controller in the aforesaid manner facilitates in accurate and real time (or near-real time) tracking of the at least one controller in the real-world environment. This subsequently enables the user to effectively interact within the XR environment using the at least one controller. In this manner, the user experiences considerable immersiveness and realism while interacting with the XR environment.

Furthermore, the term "global coordinate system" refers to a coordinate system that represents a three-dimensional (3D) space of the real-world environment as a global frame of reference. Optionally, the global coordinate system has a predefined origin and three mutually perpendicular coordinate axes. The mutually perpendicular three coordinate axes could be, for example, X, Y, and Z axes. Optionally, in this regard, any position in the global coordinate system is expressed as (x, y, z) position coordinates along the X, Y and Z axes, respectively.

In an embodiment, when determining the pose of the at least one controller in the global coordinate space, the at least one processor is configured to:

determine image coordinates of the at least one image segment in the at least one image;

determine a position of the at least one light source in the global coordinate space, based on the distance between the at least one camera and the at least one light source, the image coordinates of the at least one image segment, and transformations between the image coordinates and the global coordinate space; and estimate a position and an orientation of the at least one controller in the global coordinate space, based on the position of the at least one light source in the global coordinate space, a pre-known geometry of the at least one controller, and an orientation of the representation of the at least one controller in the at least one image.

In this regard, merely knowing an offset (i.e., the distance) between the at least one camera and the at least one light source is not enough for determining the pose of the at least one controller. Therefore, a direction of the offset is importantly required to determine the pose of the at least one controller. By determining the image coordinates of the at least one image segment, the at least one processor could easily identify a direction of the at least one light source with respect to the at least one camera.

Since the at least one image is received by the at least one processor, image coordinates of each and every image segment of the at least one image are already and accurately known to the at least one processor.

Furthermore, using the image coordinates and the transformations between the image coordinates and real-world coordinates of the global coordinate system, the at least one processor can initially determine in which region of the real-world environment does the at least one light source is present. In this regard, the at least one processor can then determine the position of the at least one light source in said region of the real-world environment using the distance between the at least one camera and the at least one light source.

It will be appreciated that the transformations between the image coordinates and the global coordinate space could be performed by the at least one processor using at least one data processing algorithm. Optionally, in this regard, the at least one data processing algorithm enables in transforming a 2D point (namely, an image coordinate) in the the at least one image segment to a 3D point in the global coordinate space, from a perspective of a pose of the at least one camera. Optionally, the at least one data processing algorithm is at least one of: an image synthesis algorithm (such as an RGB-D image synthesis algorithm), a view synthesis algorithm, a rendering algorithm. Such transformations and data processing algorithms to be used for such transformations are well-known in the art.

Once the distance between the at least one camera and the at least one light source is known and the position of the at least one light source is also known, the position of the at least one controller in the global coordinate space can be easily estimated by the at least one processor, for example, using a coordinate geometry-based formula. In addition to this, the pre-known geometry of the at least one controller (which may include a size and an overall design of the at least one controller, along with an arrangement of light source(s) on the at least one controller) can also be used by the at least one processor for determining said pose of the at least one controller. Using the pre-known geometry enables in determining said pose more accurately and realistically. Moreover, the orientation of the at least one controller can be determined from its representation in the at least one image. For example, at given time instant, the at least one controller may appear to be oriented along a north-west direction in a given image amongst the at least one image.

In another embodiment, the system further comprises an HMD-pose-tracking means, and wherein when determining the pose of the at least one controller in the global coordinate space, the at least one processor is configured to:

process HMD-pose-tracking data generated by the HMD-pose-tracking means to determine a pose of the HMD in the global coordinate system;

determine a position of the at least one light source in the global coordinate space, based on the pose of the HMD in the global coordinate system, and the distance between the at least one camera and the at least one light source; and estimate a position and an orientation of the at least one controller in the global coordinate space, based on the position of the at least one light source in the global coordinate space, a pre-known geometry of the at least one controller, and an orientation of the representation of the at least one controller in the at least one image.

The term "HMD-pose-tracking means" refers to specialized equipment that is employed to detect and/or follow the pose of the HMD within the real-world environment. Pursuant to embodiments of the present disclosure, the HMD-pose-tracking means is implemented as a true six Degrees of Freedom (6DoF) tracking system. In other words, the HMD-pose-tracking means tracks both the position and the orientation of the HMD within the 3D space of the real-world environment, which can be optionally represented by the global coordinate system. In particular, the HMD-pose-tracking means is configured to track translational movements (namely, surge, heave and sway movements) and rotational movements (namely, roll, pitch and yaw movements) of the HMD within the 3D space.

The HMD-pose-tracking means could be implemented as an internal component of the HMD, as a tracking system external to the HMD, or as a combination thereof. As an internal component of the HMD, the HMD-pose-tracking means could be implemented as at least one of: an accelerometer, a gyroscope, an Inertial Measurement Unit (IMU), a Timing and Inertial Measurement Unit (TIMU). As an external tracking system, the HMD-pose-tracking means could be implemented as at least one detector that is employed to detect at least one detectable object. When the at least one detectable object is arranged in the real-world environment, the at least one detector is arranged on the HMD, and vice versa. Optionally, in this regard, the at least one detectable object is implemented as at least one marker (for example, such as an active infra-red (IR) LED, a visible LED, a laser illuminator, a Quick Response (QR) code, an ArUco marker, a Radio Frequency Identification (RFID) marker and the like), whereas the at least one detector is implemented as at least one of: an IR camera, an IR transceiver, a visible light camera, an RFID reader.

Optionally, the at least one processor employs at least one data processing algorithm for processing the HMD-pose-tracking data. The HMD-pose-tracking data may be in form of images, IMU/TIMU values, motion sensor data values, magnetic field strength values, or similar. Correspondingly, requisite data processing algorithm(s) is/are employed to process the HMD-pose-tracking data, to determine the pose of the HMD in the global coordinate space. Examples of such at least one data processing algorithm include a feature detection algorithm, an environment mapping algorithm, a pose data extrapolation algorithm, and the like.

It will be appreciated that the position of the at least one light source in the global coordinate space can be easily determined by the at least one processor, for example by applying the distance between the at least one camera and the at least one light source in a direction of an orientation of the HMD (which is known from the pose of the HMD). Once the position of the at least one light source is known, the position and the orientation of the at least one controller in the global coordinate space can be determined in a same manner as described earlier (in the previous embodiment).

Optionally, the at least one light source comprises a first light source and a second light source that, in operation, provide light having a first wavelength and a second wavelength, respectively, the second wavelength being different from the first wavelength, and wherein the at least one image segment comprises a first image segment and a second image segment that represent the first light source and the second light source, respectively, wherein the at least one processor is configured to:

determine a first level of focussing of the first light source in the at least one image and a second level of focussing of the second light source in the at least one image, based on characteristics associated with pixels of the first image segment and the second image segment, respectively; and determine a first distance between the at least one camera and the first light source and a second distance between the at least one camera and the second light source, by interpolating and/or extrapolating reference focussing distances corresponding to the first wavelength and the second wavelength of light according to the first level of focussing and the second level of focussing, the first distance and the second distance being used to determine the pose of the at least one controller in the global coordinate space.

In this regard, instead of exclusively relying on a level of focussing of the a single light source in the at least one image for determining the distance between the at least one camera and the at least one light source, at least two light sources (namely, the first light source and the second light source) are employed. This is because when only the single light source is considered for the aforesaid determination, it is highly uncertain to determine whether an out-of-focus single light source represented in the at least one image would actually be closer than the reference focussing distance or farther from the reference focussing distance. It will be appreciated that using more than one light source may result in highly accurate and reliable determination of said distance.

A given level of focussing of a given light source in the at least one image is determined in a same manner as described earlier (with respect to the at least one light source in the at least one image). The reference focussing distances corresponding to a given wavelength of light can be ascertained by one of: performing calibration process, calculating using at least mathematical technique, as described earlier. Beneficially, using the first distance and the second distance facilitate in determining the pose of the at least one controller with high accuracy.

Once the reference focussing distances corresponding to the first wavelength and the second wavelength are known, the at least one processor can interpolate and/or extrapolate the reference focussing distances to ascertain the first distance and the second distance based on the first level of focussing and the second level of focussing. For example, the reference focussing distances corresponding to the first wavelength and the second wavelength may be 60 centimetres and 64 centimetres, and the first level of focussing is low and the second level of focussing is high. In such a case, the first distance and the second distance could be determined as 68 centimetres and 63 centimetres, respectively. Optionally, the at least one processor employs at least one interpolation technique and/or at least one extrapolation technique, for the aforesaid determination.

As an example, in a sequence of eight images I1-I8, for example, a top portion depicts the first image segment representing the first light source of the at least one controller whereas a bottom portion depicts the second image segment representing the second light source of the at least one controller. Smaller a size of a given image segment, higher is the level of focussing of its corresponding light source in an image. In the image I4, the second image segment may indicate that the second light source is well-focussed (and that it is better focussed than the first light source). This means that a distance between the at least one camera capturing the image I4 and the second light source is equal or nearly equal to the reference focussing distance corresponding to the second wavelength.

Similarly, in the image I6, the first image segment may indicate that the first light source is well-focussed (and that it is better focussed than the second light source). This means that a distance between the at least one camera capturing the image I6 and the first light source is equal or nearly equal to a reference focussing distance corresponding to the first wavelength. Moreover, the images I1 and I8, both the first light source and the second light source may have very low levels of focussing. In the images I2 and I3, the second light source has a higher level of focussing than the first light source. In the image I7, the first light source has a higher level of focussing than the second light source. Such an example has been also illustrated in conjunction with FIG. 4, for sake of better understanding.

Further benefit of having two or more different wavelength light sources is that focal length depends on index of refraction of used material in lens system. This is normally referred as axial aberration. This occurs when different wavelengths of light are focused at different distances from the lens (focus shift). This happens for example due to lens optical material refractive function being a function of wavelength. Abbe number is an approximate measure of the material's dispersion (change of refractive index versus wavelength). By selecting materials having strong dispersion the focus shift characteristics can be controlled or adjusted. In other words since the index of refraction is a function of wavelength of light, different wavelengths (colors) of light sources will different focal point (distance). This can be used to find distances or relative distances of two or more light sources (markers) having different colors.

Optionally, the at least one light source is a white light source and the at least one camera is at least one autofocus polychromatic camera, and wherein the at least one processor is further configured to:
receive, from an external tracking means, an estimated distance of the white light source from the at least one autofocus polychromatic camera; and
adjust a focus of the at least one autofocus polychromatic camera according to the estimated distance, to enable the at least one autofocus polychromatic camera in capturing the at least one image using the adjusted focus;
wherein when determining the level of focussing of the white light source in the at least one image, the at least one processor is configured to determine one of: brightnesses of constituent colour components of white light in at least one central pixel of the at least one image segment, relative brightnesses of constituent colour components of white light in at least one central pixel of the at least one image segment, wherein the brightnesses or the relative brightnesses are indicative of the level of focussing of the white light source in the at least one image,
and when determining the distance between the at least one camera and the white light source, the at least one processor is configured to correct the estimated distance according to the level of focussing of the white light source in the at least one image and the focus of the at least one autofocus polychromatic camera, to obtain a corrected distance between the between the at least one camera and the white light source, the corrected distance being used to determine the pose of the at least one controller in the global coordinate space.

In this regard, the white light source would provide the white light having several colour components, wherein each colour component has a particular wavelength. The at least one autofocus polychromatic camera would have an adjustable optical focus, and it is also able to detect and process light signals corresponding to each colour component of the white light for capturing the at least one image. The estimated distance of the white light source from the at least one autofocus polychromatic camera is estimated in a similar manner as described earlier with respect to the plurality of light sources of the plurality of controllers. Implementations of the external tracking means has been already described earlier.

When the focus of the at least one autofocus polychromatic camera is adjusted to lie at the estimated distance, the at least one controller (particularly, the white light source of the controller) is clearly represented (i.e., well-focussed) in the at least one image. In this regard, the at least one processor can determine the level of focussing using the brightnesses of the constituent colour components of the white light in the at least one central pixel of the at least one image segment or using the relative brightnesses. It will be appreciated that the at least one processor can accurately determine the brightnesses or the relative brightnesses of the constituent colour components of the white light, as the at least one image captured by the at least one autofocus polychromatic camera has comprehensive information pertaining to the aforesaid brightnesses. The technical benefit of using the brightnesses or the relative brightnesses of the constituent colour components of the white light (instead of using a monochromatic light) is that the level of focussing is highly accurately determined. This is because brightness of one colour component of the white light in the at least one image may be low, but brightness of another colour component of the white light may be high. Thus, in such a case, for determining the level of focussing, a weightage of the brightness of another colour component would be more as compared to a weightage of the brightness of the one colour component. In an example, the constituent colour components of the white light may be a red colour component, a green colour component, and a blue colour component. Greater the out-of-focus a given constituent colour component is, wider is an area on which the white light would be defocused, and dimmer is the at least one central pixel, and vice versa It is to be understood that the level of focussing of the white light source indicates different extents of focussing of the constituent colour components of the white light at different wavelengths. Since the estimated distance received from the external tracking means is only approximate, and when the level of focussing of the white light source in the at least one image is known, it can be known that an actual distance between the at least one camera and the white light source would either be greater than or less than the estimated distance, and thus the estimated distance needs to be corrected. The at least one processor can precisely adjust (namely, change) the estimated distance to match the level of focussing of the white light source in the at least one image, for obtaining the corrected distance between the between the at least one camera and the white light source. Advantageously, the pose of the at least one controller that is determined using the corrected distance is highly accurate.

Optionally, the pose of the at least one controller in the global coordinate space is used to control at least one virtual object represented in at least one extended-reality (XR) image, the at least one XR image being displayed using the HMD. In this regard, when the user is using the at least one controller during the XR session (for example, by moving the at least one controller within the real-world environment), a pose of the at least one virtual object may change in a sequence of XR images according to a change in the pose of the at least one controller. It will be appreciated that when the pose of the at least one controller is determined with high accuracy, the control of the at least one virtual object would be better and improved. Beneficially, in such a case, the user would experience considerable immersiveness and realism when interacting within the XR environment. Herein, the term "virtual object" refers to a computer-generated object (namely, a digital object). Examples of the at least one virtual object may include, but are not limited to, a virtual gadget, a virtual entity, a virtual entertainment media, a virtual vehicle or part thereof, and a virtual information.

The present disclosure also relates to the method as described above. Various embodiments and variants disclosed above, with respect to the aforementioned first aspect, apply mutatis mutandis to the method.

Optionally, in the method, the step of determining the pose of the at least one controller in the global coordinate space comprises:
  determining image coordinates of the at least one image segment in the at least one image;
  determining a position of the at least one light source in the global coordinate space, based on the distance between the at least one camera and the at least one light source, the image coordinates of the at least one image segment, and transformations between the image coordinates and the global coordinate space; and
  estimating a position and an orientation of the at least one controller in the global coordinate space, based on the position of the at least one light source in the global coordinate space, a pre-known geometry of the at least one controller, and an orientation of the representation of the at least one controller in the at least one image.

Optionally, in the method, the step of determining the pose of the at least one controller in the global coordinate space comprises:
  processing HMD-pose-tracking data generated by an HMD-pose-tracking means for determining a pose of the HMD in the global coordinate system;
  determining a position of the at least one light source in the global coordinate space, based on the pose of the HMD in the global coordinate system, and the distance between the at least one camera and the at least one light source; and
  estimating a position and an orientation of the at least one controller in the global coordinate space, based on the position of the at least one light source in the global coordinate space, a pre-known geometry of the at least one controller, and an orientation of the representation of the at least one controller in the at least one image.

Optionally, in the method, the step of determining the level of focussing of the at least one light source in the at least one image comprises:
  identifying at least one central pixel of the at least one image segment;
  measuring a brightness of the at least one central pixel; and
  determining a difference between a pre-known brightness of the at least one light source and the brightness of the at least one central pixel, wherein said difference is indicative of the level of focussing of the at least one light source in the at least one image.

Alternatively or additionally, optionally, in the method, the step of determining the level of focussing of the at least one light source in the at least one image comprises:
  determining a diameter of a circle of confusion formed by the at least one image segment; and
  determining a difference between a pre-known diameter of at least one circle of confusion and the diameter of a circle of confusion, wherein said difference is indicative of the level of focussing of the at least one light source in the at least one image.

Optionally, the at least one light source is a white light source and the at least one camera is at least one autofocus polychromatic camera, and wherein the method further comprises:
  receiving, from an external tracking means, an estimated distance of the white light source from the at least one autofocus polychromatic camera; and
  adjusting a focus of the at least one autofocus polychromatic camera according to the estimated distance, for enabling the at least one autofocus polychromatic camera in capturing the at least one image using the adjusted focus;
  wherein the step of determining the level of focussing of the white light source in the at least one image comprises determining one of: brightnesses of constituent colour components of white light in at least one central pixel of the at least one image segment, relative brightnesses of constituent colour components of white light in at least one central pixel of the at least one image segment, wherein the brightnesses or the relative brightnesses are indicative of the level of focussing of the white light source in the at least one image,
  and the step of determining the distance between the at least one camera and the white light source comprises correcting the estimated distance according to the level of focussing of the white light source in the at least one image and the focus of the at least one autofocus polychromatic camera, for obtaining a corrected distance between the between the at least one camera and the white light source, the corrected distance being used to determine the pose of the at least one controller in the global coordinate space.

Optionally, the at least one camera comprises a plurality of autofocus cameras and the at least one controller comprises a plurality of controllers, and wherein the method further comprises:
receiving, from an external tracking means, estimated distances of a plurality of light sources of the plurality of controllers from the plurality of autofocus cameras; and
controlling the plurality of autofocus cameras for capturing images representing one or more controllers amongst the plurality of controllers from perspectives of the plurality of autofocus cameras, by one of:
selecting a common focus to be employed for focussing the plurality of autofocus cameras, based on the estimated distances; or
adjusting focuses of the plurality of autofocus cameras according to the estimated distances, in a multiplexed manner.

Optionally, the at least one light source comprises a first light source and a second light source that, in operation, provide light having a first wavelength and a second wavelength, respectively, the second wavelength being different from the first wavelength, and wherein the at least one image segment comprises a first image segment and a second image segment that represent the first light source and the second light source, respectively,
wherein the method comprises:
determining a first level of focussing of the first light source in the at least one image and a second level of focussing of the second light source in the at least one image, based on characteristics associated with pixels of the first image segment and the second image segment, respectively; and
determining a first distance between the at least one camera and the first light source and a second distance between the at least one camera and the second light source, by interpolating and/or extrapolating reference focussing distances corresponding to the first wavelength and the second wavelength of light according to the first level of focussing and the second level of focussing, the first distance and the second distance being used for determining the pose of the at least one controller in the global coordinate space.

Optionally, the one or more light sources, in operation, provide light having different wavelengths at different times, and the at least one image comprises a plurality of images that are captured at the different times.

Optionally, the one or more light sources comprise an array of light sources that are arranged in proximity to each other, wherein different light sources amongst the array, in operation, provide light having different wavelengths, and wherein each light source of the array is individually controllable to be switched on and switched off according to a pattern.

Optionally, the at least one camera has an apodized aperture, and wherein a transmission curve associated with the apodized aperture affects a shape of the at least one image segment in the at least one image.

Optionally, the pose of the at least one controller in the global coordinate space is used to control at least one virtual object represented in at least one extended-reality (XR) image, the at least one XR image being displayed using the HMD.

Optionally, the method further comprises determining the reference focussing distance corresponding to the wavelength of light provided by the at least one light source by one of:
executing a calibration process wherein a user of the at least one controller is instructed to move the at least one controller with respect to the at least one camera until the at least one light source of the at least one controller is in-focus in a calibration image captured during such moving, a distance of the at least one light source from the at least one camera at a time of capturing said calibration image being determined as the reference focussing distance corresponding to the wavelength of light emitted by the at least one light source; or
calculating the reference focussing distance corresponding to the wavelength of light emitted by the at least one light source using at least one mathematical formula.

Optionally, the one or more light sources provide light by at least one of: light emitter, light reflector, light transmitter, light transflector.

DETAILED DESCRIPTION OF THE DRAWINGS

Referring to FIG. 1, illustrated is a schematic illustration of an exemplary environment in which a controller-tracking system 100 is in use, in accordance with an embodiment of the present disclosure. The controller-tracking system 100 comprises at least one camera (depicted as a camera 102) arranged on a portion of a head-mounted display (HMD) 104 that faces a real-world environment in which the HMD 104 is in use, one or more light sources (depicted as ten light sources 106a, 106b, 106c, 106d, 106e, 106f, 106g, 106h, 106i, and 106j, which are hereinafter collectively referenced as 106a-j) arranged on at least one controller (depicted as a controller 108) that is to be tracked, and at least one processor (depicted as a processor 110). The controller 108 is shown to be handheld by a user 112 in the user's right hand. The HMD 104, in use, is worn by the user 112 over the user's head. The light sources 106a-j, in operation, provide light having at least one wavelength that is detectable by the camera 102. The controller-tracking system 100 is shown to optionally also comprise an HMD-pose-tracking means 114.

It may be understood by a person skilled in the art that FIG. 1 includes a simplified architecture of the controller-tracking system 100, for sake of clarity, which should not unduly limit the scope of the claims herein. It is to be understood that the specific implementation of the controller-tracking system 100 is provided as an example and is not to be construed as limiting it to specific numbers or types of cameras, light sources, controllers, processors, and pose-tracking means. The person skilled in the art will recognize many variations, alternatives, and modifications of embodiments of the present disclosure. For example, the processor 110 may be arranged external to the HMD 104. For example, the controller-tracking system 100 may exclude the HMD-pose-tracking means 114, or the HMD-pose-tracking means 114 may be arranged external to the HMD 104, or similar. For example, the processor 110 may be coupled to an external tracking means 116 that is employed when the light sources 106a-j are white light sources and the camera 102 is an autofocus polychromatic camera. It will be appreciated that at least one camera may comprise a plurality of autofocus cameras (not shown) and the at least one controller may comprise a plurality of controllers (not shown).

Figure 2A:
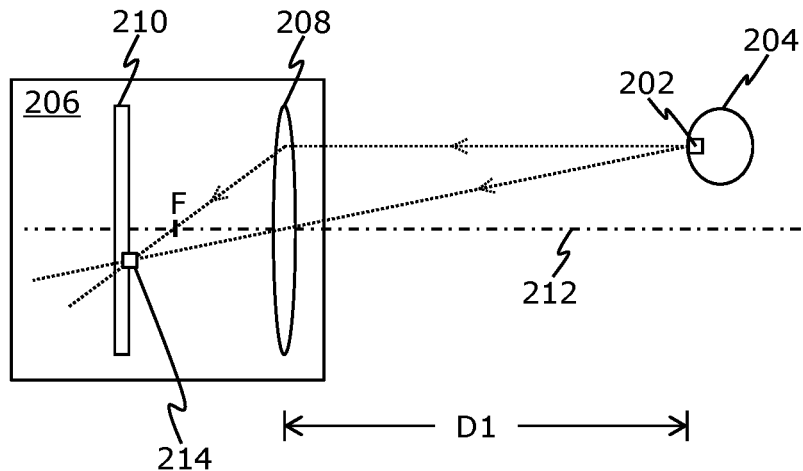
FIGS. 2A and 2B are ray diagrams illustrating different levels of focussing of a light source in an image, in accordance with an embodiment of the present disclosure.
Figure 2B:
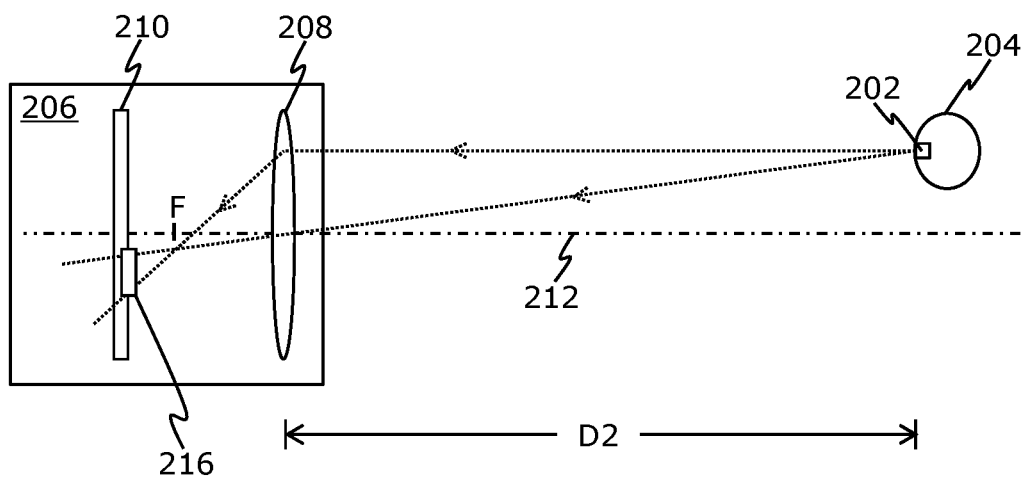

Referring to FIGS. 2A and 2B, illustrated are ray diagrams illustrating different levels of focussing of a light source 202 in an image, in accordance with an embodiment of the present disclosure. In FIGS. 2A and 2B, the light source 202 is shown, for example, to be point-sized and is arranged on a controller 204. The light source 202, in operation, provides light having a wavelength that is detectable by a camera 206. The image is captured by the camera 206. The camera 206 comprises a camera lens 208 and an image sensor 210. The camera 206 has a camera optical axis 212 (represented as a dash-dot axis). A focal point F corresponds to the wavelength of light provided by the light source 202.

In FIG. 2A, there is shown an image segment 214 that represents the light source 202. Based on characteristics associated with pixels of the image segment 214, it is determined that a level of focussing of the light source 202 in the image is high (i.e., the light source 202 is sharply focussed or well-focussed). In such a case, a distance D1 between the camera 206 and the light source 202 is equal to or nearly equal to a reference focussing distance corresponding to the wavelength of light provided by the light source 202. A pose of the controller 204 in a global coordinate space of a real-world environment can be determined using the distance D1.

In FIG. 2B, there is shown an image segment 216 that represents the light source 202. Based on characteristics associated with pixels of the image segment 214, it is determined that a level of focussing of the light source 202 in the image is lesser than the case shown in FIG. 2A (i.e., the light source 202 is less focussed than the case shown in FIG. 2A). This less level of focussing is shown by the image segment 216 being bigger in size than the image segment 214 of FIG. 2A, and bigger in size than the light source 202. In such a case, a distance D2 between the camera 206 and the light source 202 is different from a reference focussing distance corresponding to the wavelength of light provided by the light source 202. The distance D2 is greater than the distance D1 (in FIG. 2A). A pose of the controller 204 in the global coordinate space of the real-world environment can be determined using the distance D2.

FIGS. 2A and 2B are merely examples, which should not unduly limit the scope of the claims herein. The person skilled in the art will recognize many variations, alternatives, and modifications of embodiments of the present disclosure.

Figure 3A:
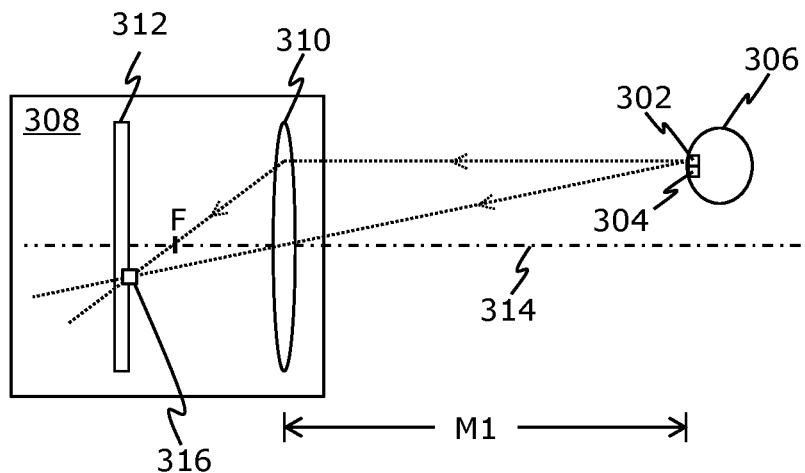
FIGS. 3A and 3B are ray diagrams illustrating sharp focussing of different light sources in different images, in accordance with an embodiment of the present disclosure.
Figure 3B:
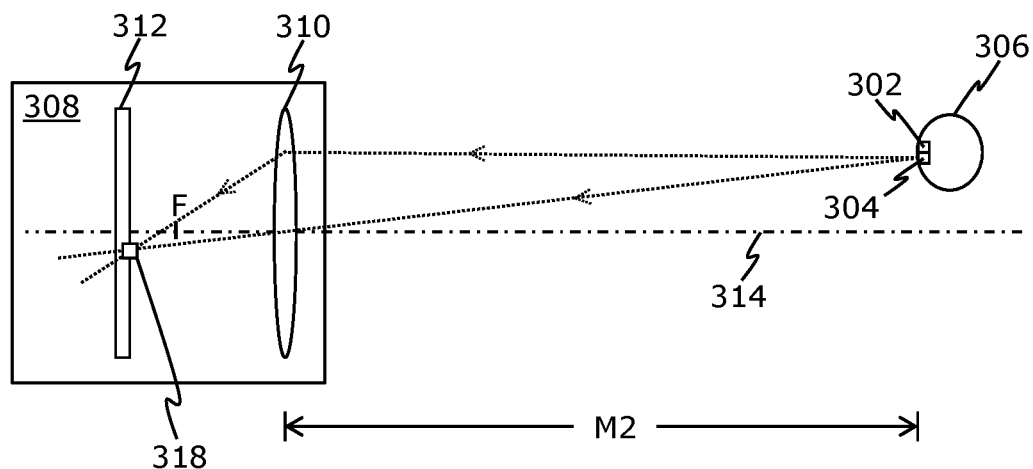

Referring to FIGS. 3A and 3B, illustrated are ray diagrams illustrating sharp focussing of different light sources in different images, in accordance with an embodiment of the present disclosure. The different light sources are shown as a first light source 302 and a second light source 304 that are point-sized for example, and that, in operation, provide light having a first wavelength and a second wavelength, respectively, the second wavelength being different from the first wavelength. The first light source 302 and the second light source 304 are arranged on a controller 306. Different images of the different light sources are captured by a camera 308. The camera 308 comprises a camera lens 310 and an image sensor 312. The camera 308 has a camera optical axis 314 (represented as a dash-dot axis). A focal point F corresponds to the first wavelength of light provided by the first light source 302.

In FIG. 3A, there is shown a first image segment 316 that represents the first light source 302 in one image amongst the different images. Notably, characteristics associated with pixels of the first image segment 316 indicate that a level of focussing of the first light source 302 in said image is high. A size of the first image segment 316 is shown to be indicative of the point-size of the first light source 302. In such a case, a first distance M1 between the camera 308 and the first light source 302 is equal to or nearly equal to a reference focussing distance corresponding to the first wavelength of light provided by the first light source 302. In said image, a level of focussing of the second light source 304 would be lesser than the level of focussing of the first light source 302.

In FIG. 3B, there is shown a second image segment 318 that represents the second light source 304 in another image amongst the different images. Notably, characteristics associated with pixels of the second image segment 318 indicate that a level of focussing of the second light source 304 in said image is high. A size of the second image segment 318 is shown to be indicative of the point-size of the second light source 304. In such a case, a second distance M2 between the camera 308 and the second light source 304 is equal to or nearly equal to a reference focussing distance corresponding to the second wavelength of light provided by the second light source 304. In said image, a level of focussing of the first light source 302 would be lesser than the level of focussing of the second light source 304.

FIGS. 3A and 3B are merely examples, which should not unduly limit the scope of the claims herein. The person skilled in the art will recognize many variations, alternatives, and modifications of embodiments of the present disclosure.

Figure 4:
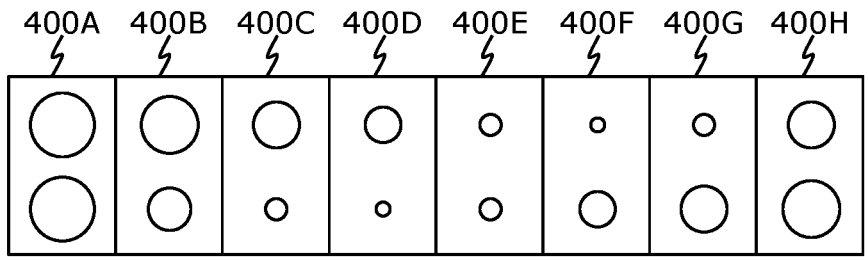
FIG. 4 is an illustration of a set of images representing different light sources of a controller, in accordance with an embodiment of the present disclosure.

Referring to FIG. 4, illustrated is a set of images 400A, 400B, 400C, 400D, 400E, 400F, 400G, and 400H (hereinafter collectively referenced as 400A-H) representing different light sources of a controller (not shown), in accordance with an embodiment of the present disclosure. In the set of images 400A-H, for example, a top portion depicts a first image segment representing a first light source of the controller whereas a bottom portion depicts a second image segment representing a second light source of the controller. Smaller a size of a given image segment, higher is a level of focussing of its corresponding light source in an image.

In the image 400D, the second image segment indicates that the second light source is well-focussed (and that it is better focussed than the first light source). This means that a distance between a camera capturing the image 400D and the second light source (and in particular, the controller) is equal or nearly equal to a reference focussing distance corresponding to a second wavelength of light provided by the second light source.

In the image 400F, the first image segment indicates that the first light source is well-focussed (and that it is better focussed than the second light source). This means that a distance between a camera capturing the image 400F and the first light source (and in particular, the controller) is equal or nearly equal to a reference focussing distance corresponding to a first wavelength of light provided by the first light source.

In the image 400E, the first image segment and the second image segment indicate that the first light source and the second light source have equally high levels of focussing (but not the highest level of focussing). This means that a distance between a camera capturing the image 400E and a given light source (and in particular, the controller) is between a reference focussing distance corresponding to a first wavelength of light provided by the first light source and a reference focussing distance corresponding to a second wavelength of light provided by the second light source.

In the images 400A and 400H, both the first light source and the second light source have very low levels of focussing. In the images 400B and 400C, the second light source has a higher level of focussing than the first light source. In the image 400G, the first light source has a higher level of focussing than the second light source.

FIG. 4 is merely an example, which should not unduly limit the scope of the claims herein. The person skilled in the art will recognize many variations, alternatives, and modifications of embodiments of the present disclosure.

Figure 5:
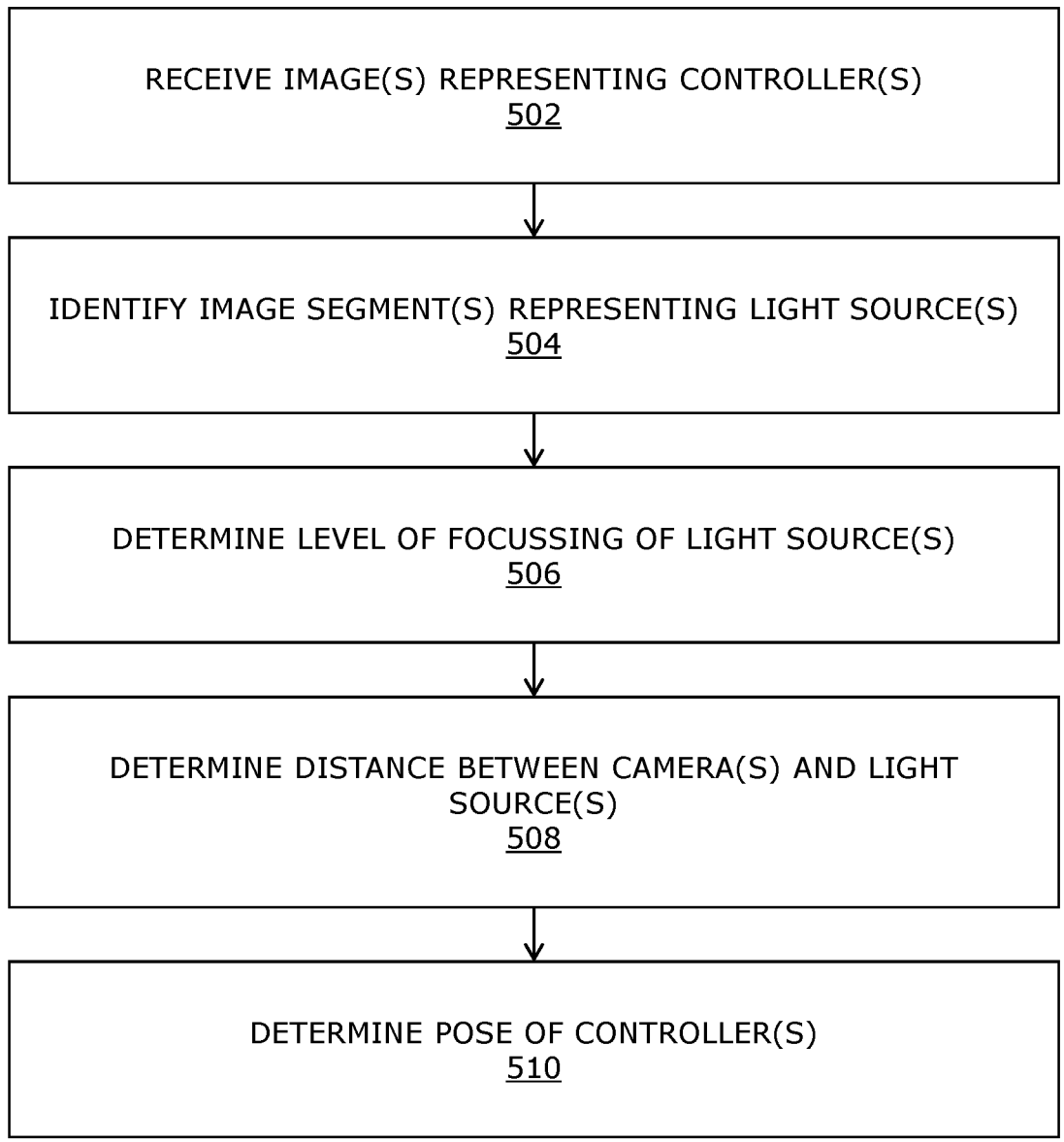
FIG. 5 illustrates steps of a method for controller-tracking, in accordance with an embodiment of the present disclosure.

Referring to FIG. 5, illustrated are steps of a method for controller-tracking, in accordance with an embodiment of the present disclosure. At step 502, at least one image captured by at least one camera is received, the at least one image representing at least one controller from a perspective of the at least one camera, the at least one camera being arranged on a portion of a head-mounted display (HMD) that faces a real-world environment in which the HMD is in use, and wherein one or more light sources are arranged on the at least one controller that is to be tracked, the at least one controller being associated with the HMD, and wherein the one or more light sources, in operation, provide light having at least one wavelength that is detectable by the at least one camera. At step 504, there is identified at least one image segment in the at least one image that represents at least one light source of the at least one controller. At step 506, a level of focussing of the at least one light source in the at least one image is determined, based on characteristics associated with pixels of the at least one image segment. At step 508, a distance between the at least one camera and the at least one light source is determined, based on the level of focussing of the at least one light source in the at least one image, intrinsic parameters of the at least one camera, and a reference focussing distance corresponding to a wavelength of light provided by the at least one light source. At step 510, a pose of the at least one controller in a global coordinate space of the real-world environment is determined, using the distance between the at least one camera and the at least one light source.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A controller-tracking system comprising:
   at least one camera arranged on a portion of a head-mounted display (HMD) that faces a real-world environment in which the HMD is in use;
   one or more light sources arranged on at least one controller that is to be tracked, the at least one controller being associated with the HMD, wherein the one or more light sources, in operation, provide light having at least one wavelength that is detectable by the at least one camera; and
   at least one processor configured to:
      receive at least one image captured by the at least one camera, the at least one image representing the at least one controller from a perspective of the at least one camera;
      identify at least one image segment in the at least one image that represents at least one light source of the at least one controller;
      determine a level of focussing of the at least one light source in the at least one image, based on characteristics associated with pixels of the at least one image segment;
      determine a distance between the at least one camera and the at least one light source, based on the level of focussing of the at least one light source in the at least one image, intrinsic parameters of the at least one camera, and a reference focussing distance corresponding to a wavelength of light provided by the at least one light source; and
      determine a pose of the at least one controller in a global coordinate space of the real-world environment, using the distance between the at least one camera and the at least one light source.

2. The controller-tracking system of claim 1, wherein when determining the pose of the at least one controller in the global coordinate space, the at least one processor is configured to:
   determine image coordinates of the at least one image segment in the at least one image;
   determine a position of the at least one light source in the global coordinate space, based on the distance between the at least one camera and the at least one light source, the image coordinates of the at least one image segment, and transformations between the image coordinates and the global coordinate space; and
   estimate a position and an orientation of the at least one controller in the global coordinate space, based on the position of the at least one light source in the global coordinate space, a pre-known geometry of the at least one controller, and an orientation of the representation of the at least one controller in the at least one image.

3. The controller-tracking system of claim 1, wherein the system further comprises an HMD-pose-tracking means, and wherein when determining the pose of the at least one controller in the global coordinate space, the at least one processor is configured to:
   process HMD-pose-tracking data generated by the HMD-pose-tracking means to determine a pose of the HMD in the global coordinate system;
   determine a position of the at least one light source in the global coordinate space, based on the pose of the HMD in the global coordinate system, and the distance between the at least one camera and the at least one light source; and
   estimate a position and an orientation of the at least one controller in the global coordinate space, based on the position of the at least one light source in the global coordinate space, a pre-known geometry of the at least one controller, and an orientation of the representation of the at least one controller in the at least one image.

4. The controller-tracking system of claim 1, wherein when determining the level of focussing of the at least one light source in the at least one image, the at least one processor is configured to:
   identify at least one central pixel of the at least one image segment;
   measure a brightness of the at least one central pixel; and
   determine a difference between a pre-known brightness of the at least one light source and the brightness of the at least one central pixel, wherein said difference is indicative of the level of focussing of the at least one light source in the at least one image.

5. The controller-tracking system of claim 1, wherein when determining the level of focussing of the at least one light source in the at least one image, the at least one processor is configured to:
  determine a diameter of a circle of confusion formed by the at least one image segment; and
  determine a difference between a pre-known diameter of at least one circle of confusion and the diameter of a circle of confusion, wherein said difference is indicative of the level of focussing of the at least one light source in the at least one image.

6. The controller-tracking system of claim 1, wherein the at least one light source is a white light source and the at least one camera is at least one autofocus polychromatic camera, and wherein the at least one processor is further configured to:
  receive, from an external tracking means, an estimated distance of the white light source from the at least one autofocus polychromatic camera; and
  adjust a focus of the at least one autofocus polychromatic camera according to the estimated distance, to enable the at least one autofocus polychromatic camera in capturing the at least one image using the adjusted focus;
  wherein when determining the level of focussing of the white light source in the at least one image, the at least one processor is configured to determine one of: brightnesses of constituent colour components of white light in at least one central pixel of the at least one image segment, relative brightnesses of constituent colour components of white light in at least one central pixel of the at least one image segment, wherein the brightnesses or the relative brightnesses are indicative of the level of focussing of the white light source in the at least one image,
  and when determining the distance between the at least one camera and the white light source, the at least one processor is configured to correct the estimated distance according to the level of focussing of the white light source in the at least one image and the focus of the at least one autofocus polychromatic camera, to obtain a corrected distance between the between the at least one camera and the white light source, the corrected distance being used to determine the pose of the at least one controller in the global coordinate space.

7. The controller-tracking system of claim 1, wherein the at least one camera comprises a plurality of autofocus cameras and the at least one controller comprises a plurality of controllers, and wherein the at least one processor is further configured to:
  receive, from an external tracking means, estimated distances of a plurality of light sources of the plurality of controllers from the plurality of autofocus cameras; and
  control the plurality of autofocus cameras for capturing images representing one or more controllers amongst the plurality of controllers from perspectives of the plurality of autofocus cameras, by one of:
    electing a common focus to be employed for focussing the plurality of autofocus cameras, based on the estimated distances; or
    adjusting focuses of the plurality of autofocus cameras according to the estimated distances, in a multiplexed manner.

8. The controller-tracking system of claim 1, wherein the at least one light source comprises a first light source and a second light source that, in operation, provide light having a first wavelength and a second wavelength, respectively, the second wavelength being different from the first wavelength, and wherein the at least one image segment comprises a first image segment and a second image segment that represent the first light source and the second light source, respectively,
  wherein the at least one processor is configured to:
  determine a first level of focussing of the first light source in the at least one image and a second level of focussing of the second light source in the at least one image, based on characteristics associated with pixels of the first image segment and the second image segment, respectively; and
  determine a first distance between the at least one camera and the first light source and a second distance between the at least one camera and the second light source, by interpolating and/or extrapolating reference focussing distances corresponding to the first wavelength and the second wavelength of light according to the first level of focussing and the second level of focussing, the first distance and the second distance being used to determine the pose of the at least one controller in the global coordinate space.

9. The controller-tracking system of claim 1, wherein the one or more light sources, in operation, provide light having different wavelengths at different times, and the at least one image comprises a plurality of images that are captured at the different times.

10. The controller-tracking system of any of claim 1, wherein the one or more light sources comprise an array of light sources that are arranged in proximity to each other, wherein different light sources amongst the array, in operation, provide light having different wavelengths, and wherein each light source of the array is individually controllable to be switched on and switched off according to a pattern.

11. The controller-tracking system of claim 1, wherein the at least one camera has an apodized aperture, and wherein a transmission curve associated with the apodized aperture affects a shape of the at least one image segment in the at least one image.

12. The controller-tracking system of claim 1, wherein the pose of the at least one controller in the global coordinate space is used to control at least one virtual object represented in at least one extended-reality (XR) image, the at least one XR image being displayed using the HMD.

13. The controller-tracking system of claim 1, wherein the at least one processor is further configured to determine the reference focussing distance corresponding to the wavelength of light provided by the at least one light source by one of:
  executing a calibration process wherein a user of the at least one controller is instructed to move the at least one controller with respect to the at least one camera until the at least one light source of the at least one controller is in-focus in a calibration image captured during such moving, a distance of the at least one light source from the at least one camera at a time of capturing said calibration image being determined as the reference focussing distance corresponding to the wavelength of light emitted by the at least one light source; or
  calculating the reference focussing distance corresponding to the wavelength of light emitted by the at least one light source using at least one mathematical formula.

14. The controller-tracking system of claim 1, wherein the one or more light sources provide light by at least one of: light emitter, light reflector, light transmitter, light transflector.

15. A method for controller-tracking, the method comprising:
- receiving at least one image captured by at least one camera, the at least one image representing at least one controller from a perspective of the at least one camera, the at least one camera being arranged on a portion of a head-mounted display (HMD) that faces a real-world environment in which the HMD is in use, and wherein one or more light sources are arranged on the at least one controller that is to be tracked, the at least one controller being associated with the HMD, and wherein the one or more light sources, in operation, provide light having at least one wavelength that is detectable by the at least one camera;
- identifying at least one image segment in the at least one image that represents at least one light source of the at least one controller;
- determining a level of focussing of the at least one light source in the at least one image, based on characteristics associated with pixels of the at least one image segment;
- determining a distance between the at least one camera and the at least one light source, based on the level of focussing of the at least one light source in the at least one image, intrinsic parameters of the at least one camera, and a reference focussing distance corresponding to a wavelength of light provided by the at least one light source; and
- determining a pose of the at least one controller in a global coordinate space of the real-world environment, using the distance between the at least one camera and the at least one light source.

16. The method of claim 15, wherein the step of determining the pose of the at least one controller in the global coordinate space comprises:
- determining image coordinates of the at least one image segment in the at least one image;
- determining a position of the at least one light source in the global coordinate space, based on the distance between the at least one camera and the at least one light source, the image coordinates of the at least one image segment, and transformations between the image coordinates and the global coordinate space; and
- estimating a position and an orientation of the at least one controller in the global coordinate space, based on the position of the at least one light source in the global coordinate space, a pre-known geometry of the at least one controller, and an orientation of the representation of the at least one controller in the at least one image.

17. The method of claim 15, wherein the step of determining the pose of the at least one controller in the global coordinate space comprises:
- processing HMD-pose-tracking data generated by an HMD-pose-tracking means for determining a pose of the HMD in the global coordinate system;
- determining a position of the at least one light source in the global coordinate space, based on the pose of the HMD in the global coordinate system, and the distance between the at least one camera and the at least one light source; and
- estimating a position and an orientation of the at least one controller in the global coordinate space, based on the position of the at least one light source in the global coordinate space, a pre-known geometry of the at least one controller, and an orientation of the representation of the at least one controller in the at least one image.

18. The method of claim 15, wherein the step of determining the level of focussing of the at least one light source in the at least one image comprises:
- identifying at least one central pixel of the at least one image segment;
- measuring a brightness of the at least one central pixel; and
- determining a difference between a pre-known brightness of the at least one light source and the brightness of the at least one central pixel, wherein said difference is indicative of the level of focussing of the at least one light source in the at least one image.

19. The method of claim 15, the step of determining the level of focussing of the at least one light source in the at least one image comprises:
- determining a diameter of a circle of confusion formed by the at least one image segment; and
- determining a difference between a pre-known diameter of at least one circle of confusion and the diameter of a circle of confusion, wherein said difference is indicative of the level of focussing of the at least one light source in the at least one image.

20. The method of claim 15, wherein the at least one light source is a white light source and the at least one camera is at least one autofocus polychromatic camera, and wherein the method further comprises:
- receiving, from an external tracking means, an estimated distance of the white light source from the at least one autofocus polychromatic camera; and
- adjusting a focus of the at least one autofocus polychromatic camera according to the estimated distance, for enabling the at least one autofocus polychromatic camera in capturing the at least one image using the adjusted focus;
- wherein the step of determining the level of focussing of the white light source in the at least one image comprises determining one of: brightnesses of constituent colour components of white light in at least one central pixel of the at least one image segment, relative brightnesses of constituent colour components of white light in at least one central pixel of the at least one image segment, wherein the brightnesses or the relative brightnesses are indicative of the level of focussing of the white light source in the at least one image,
- and the step of determining the distance between the at least one camera and the white light source comprises correcting the estimated distance according to the level of focussing of the white light source in the at least one image and the focus of the at least one autofocus polychromatic camera, for obtaining a corrected distance between the between the at least one camera and the white light source, the corrected distance being used to determine the pose of the at least one controller in the global coordinate space.

21. The method of claim 15, wherein the at least one camera comprises a plurality of autofocus cameras and the at least one controller comprises a plurality of controllers, and wherein the method further comprises:
- receiving, from an external tracking means, estimated distances of a plurality of light sources of the plurality of controllers from the plurality of autofocus cameras; and
- controlling the plurality of autofocus cameras for capturing images representing one or more controllers amongst the plurality of controllers from perspectives of the plurality of autofocus cameras, by one of:

selecting a common focus to be employed for focussing the plurality of autofocus cameras, based on the estimated distances; or adjusting focuses of the plurality of autofocus cameras according to the estimated distances, in a multiplexed manner.

22. The method of claim 15, wherein the at least one light source comprises a first light source and a second light source that, in operation, provide light having a first wavelength and a second wavelength, respectively, the second wavelength being different from the first wavelength, and wherein the at least one image segment comprises a first image segment and a second image segment that represent the first light source and the second light source, respectively, wherein the method comprises:

determining a first level of focussing of the first light source in the at least one image and a second level of focussing of the second light source in the at least one image, based on characteristics associated with pixels of the first image segment and the second image segment, respectively; and determining a first distance between the at least one camera and the first light source and a second distance between the at least one camera and the second light source, by interpolating and/or extrapolating reference focussing distances corresponding to the first wavelength and the second wavelength of light according to the first level of focussing and the second level of focussing, the first distance and the second distance being used for determining the pose of the at least one controller in the global coordinate space.

23. The method of claim 15, wherein the one or more light sources, in operation, provide light having different wavelengths at different times, and the at least one image comprises a plurality of images that are captured at the different times.

24. The method of claim 15, wherein the one or more light sources comprise an array of light sources that are arranged in proximity to each other, wherein different light sources amongst the array, in operation, provide light having different wavelengths, and wherein each light source of the array is individually controllable to be switched on and switched off according to a pattern.

25. The method of claim 15, wherein the at least one camera has an apodized aperture, and wherein a transmission curve associated with the apodized aperture affects a shape of the at least one image segment in the at least one image.

26. The method of claim 15, wherein the pose of the at least one controller in the global coordinate space is used to control at least one virtual object represented in at least one extended-reality (XR) image, the at least one XR image being displayed using the HMD.

27. The method of claim 15, wherein further comprising determining the reference focussing distance corresponding to the wavelength of light provided by the at least one light source by one of:

executing a calibration process wherein a user of the at least one controller is instructed to move the at least one controller with respect to the at least one camera until the at least one light source of the at least one controller is in-focus in a calibration image captured during such moving, a distance of the at least one light source from the at least one camera at a time of capturing said calibration image being determined as the reference focussing distance corresponding to the wavelength of light emitted by the at least one light source; or calculating the reference focussing distance corresponding to the wavelength of light emitted by the at least one light source using at least one mathematical formula.

28. The method of claim 15, wherein the one or more light sources provide light by at least one of: light emitter, light reflector, light transmitter, light transflector.

* * * * *